United States Patent [19]

Juma

[11] Patent Number: 4,760,643
[45] Date of Patent: Aug. 2, 1988

[54] HOLE SAW

[76] Inventor: Mahmud A. M. Juma, Blangstedgårdsvej 12, 5220 Odense S0, Denmark

[21] Appl. No.: 820,323

[22] Filed: Jan. 21, 1986

Related U.S. Application Data

[63] Continuation-in-part of Ser. No. 567,187, Dec. 30, 1983, abandoned.

[51] Int. Cl.$^4$ ............................................. B23D 45/00
[52] U.S. Cl. ................................... 30/166 A; 144/218
[58] Field of Search ......................... 30/166, 276, 357; 408/209, 239; 144/272, 218; 279/1 A

[56] References Cited

U.S. PATENT DOCUMENTS

| | | | |
|---|---|---|---|
| 1,233,613 | 7/1917 | Schreurs | 408/239 |
| 3,360,025 | 12/1967 | Gallo, Jr. | 408/239 |
| 3,647,310 | 3/1972 | Morse | 408/209 X |
| 4,413,937 | 11/1983 | Gutsche | 408/239 X |

Primary Examiner—E. R. Kazenske
Assistant Examiner—Willmon Fridie, Jr.
Attorney, Agent, or Firm—Antonelli, Terry & Wands

[57] ABSTRACT

A hole making implement of the cylindrical saw blade type for connection with a drill bit and the chuck of a drilling machine is made as a unitary member of sheet metal. The member has an axially split, central sleeve portion adapted to receive the shank of a drill bit and be inserted into the chuck together with the drill bit so as to be fixable, for operation, without requiring a conventional radial clamp screw. The sleeve portion may be provided on conventional hole saw bodies as well.

10 Claims, 1 Drawing Sheet

HOLE SAW

This is a continuation-in-part application of Ser. No. 567,187, filed Dec. 30, 1983, now abandoned.

BACKGROUND OF THE INVENTION

The present invention relates to hole drilling devices and, more particularly to hole saws, which, for example, include a cylindrical saw blade, one end of which is provided with a circumferential row of saw teeth, while the opposite end is associated with a carrier plate having a central hole for receiving a drill bit and a collar portion adapted to be clamped to the drill bit so as to enable the hole saw member to be fixed to the drill bit and rotate therewith when the drill bit is caused rotated when, for example, mounted in the chuck of a drilling machine. Hereby the drill bit as protruding from the plane of the free annular saw tooth edge of the hole saw implement provides for an initial centering of the cylindrical hole saw element, which will thereafter cut out a corresponding hole in the material member in question in response to axial displacement of the combined drill bit and circular hole saw element, such that a hole may be drilled or rather sawed, the diameter of which exceeds the maximum diameter of drill bits as mountable directly in the chuck of the drilling machine.

Hole drilling implements of the aforementioned type have been proposed which generally include a carrier member, with the carrier plate and collar portion being formed in one piece, and the cylindrical saw blade being secured to the carrier plate, while the collar portion is provided with a radial clamp screw for fastening the implement to the shank of a drill bit in a desired axial position on the bit. It is well known, however, that a safe fastening of the implement for preventing mutual rotation of the drill bit and the implement requires a high pressure of the clamp screw against the bit shank surface, whereby the collar portion must be of a heavy construction, or the clamp screw cooperates with a recess or flat face portion of the bit shank, whereby the drill bit has to be specifically designed for the specific purpose.

It is the object of the invention to provide hole drilling device of the aforementioned type, which is of a simple design and yet easily fastenable to the drill bit.

According to the invention the collar portion of the carrier plate includes an axially split sleeve member of a cylindrical configuration operable to receive a selected standard drill bit with loose fit and to be inserted, together with the drill bit, into a clamping chuck so as to be fastenable to the drill bit and to the chuck by actuation of the radial clamp means of the chuck. Thus, the drill bit need no adaption whatsoever, and the collar portion of the implement will be firmly secured by the tightening of the chuck.

Under these conditions the collar or sleeve portion does not require any clamp screw, and it may be made of a relatively thin metal sheet material. This leads to a further and important development according to the invention, namely that the entire implement may be made from a sheet blank, which is pressed into a shape comprising both the saw blade cylinder, the carrier plate portion and the sleeve portion, whereby the implement may be produced at very low costs.

BRIEF DESCRIPTION OF THE DRAWINGS

In the following the invention is described in more detail with reference to the drawing.

DETAILED DESCRIPTION

Figure 1:
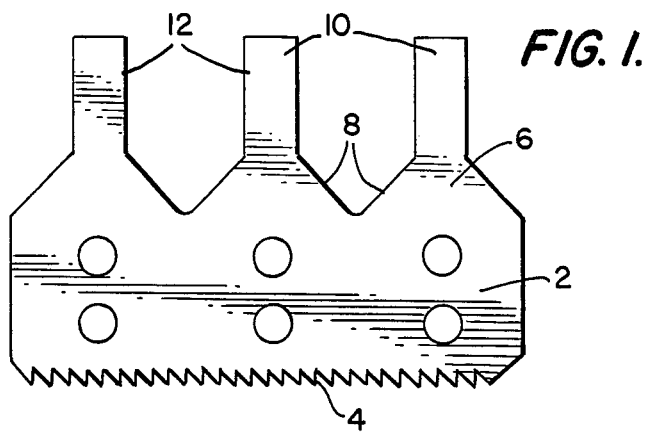
FIG. 1 is a plan view of a sheet blank for an implement according to the invention.

The metal sheet blank shown in FIG. 1 comprises a lower rectangular area 2, the lower edge of which is shaped with a row of saw teeth 4. The lower rectangular area 2 is, at a top thereof, extended into three conical areas 6, the outer edges 8 of which are each extend upwardly into a relatively narrow strip portion 10 having side edges 12.

For forming the desired implement the sheet blank is rolled together lengthwise and subjected to a die pressing, whereby the lower area 2 a cylinder 14, (FIG. 2) while the conical portions 6 are pressed inwardly so as to generally form an upper, slightly conical end plate portion 16 on the cylinder 14. Centrally of the end plate portion 16, the strip portions 10 are held vertically or in concentric alignment with the cylinder 14 and are pressed into a rounded shaped so as together form a regular tubular portion 18 having three axial splits 20 as defined by the opposed side edges 12 of the strip portions 10. The splits 20 continue in corresponding radial splits 22 in the plate portion 16, and one of these splits as defined by the opposed free ends of the sheet blank contiues as an axial split 24 down through the saw blade cylinder 14. It should be mentioned that even the conventional implements show such an axial split in the saw blade cylinder and that the narrow split is fully acceptable, when the sheet material is reasonably strong.

Figure 2:
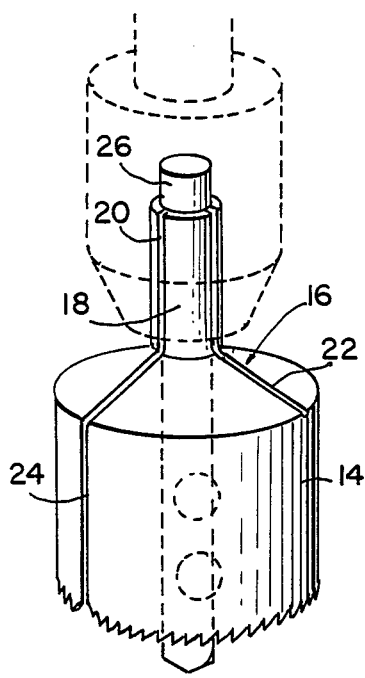
FIG. 2 is a perspective view of the implement as positioned on a drill bit.
Figure 3:
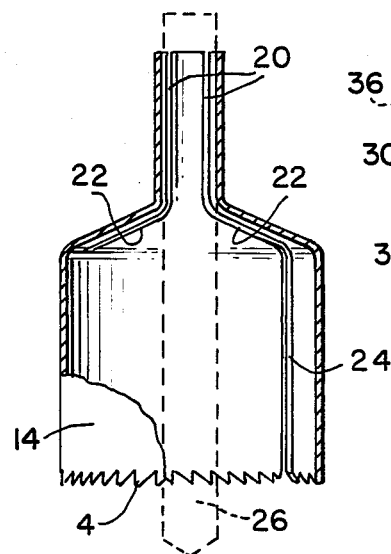
FIG. 3 is an axial sectional view of the implement.

The tubular portion 18 has an interior diameter which is similar to or only slightly larger than the diameter of some selected standard drill bit size. The implement, therefore, will be usable together with such a standard drill bit 26, the shank portion of which is pushed into or preferably through the tubular portion 18 as shown in FIG. 2.

All that is thereafter necessary is to put the combined drill shank and tube portion 18 into the chuck of a drilling machine and to tighten the chuck about the tube portion 18, whereby both the drill bit and the implement will be effectively held by the chuck.

It will be appreciated that the sleeve portion 18 could well be associated with a saw cylinder and carrier member unit 14,16 of any other detailed design or construction, and in that case it could be sufficient if the sleeve portion is provided with but a single axial split 20.

Figure 4:
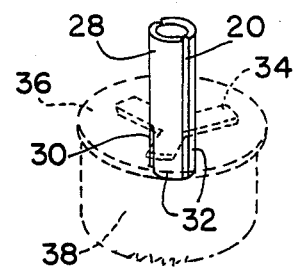
FIG. 4 is a view of the implement showing two splits extending axially from the lower edge

This is further illustrated in FIG. 4, which shows a sleeve member 28 having the said split 20 and also having, in the lower end portion thereof, two further splits 30 spaced angularly 120° from the split 20 and extending axially from the lower edge and along a partial length of the sleeve 28, whereby three depending part-cylindrical portions 32 are formed between the splits 20 and 30. These portions may, in a die pressing operation, be spread as flat radial wings 34 as shown in dotted lines, and these wings in their turn may be connected, by welding or otherwise, to the top side or the bottom side of a carrier element 36 for a cylindrical saw blade 38. Thus, the carrier element 36 and the saw blade 38 and their mutual connection may be designed in any suitable and even well known manner.

Figure 5:
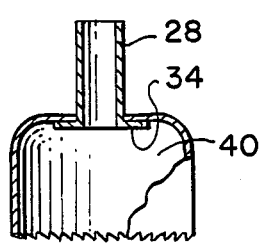
FIG. 5 is a view of a comercially known saw implement with a sleeve according to the invention

Another example is shown in FIG. 5, where a commercially known saw implement body shaped as a die pressed inverted cup member 40, is associated with a sleeve 28 according to the invention rather than with a conventional cylindrical shaft as having a radial clamp screw. The central bottom portion of the cup member 40 has a hole, which receives the sleeve 28, and a collar 36 of the sleeve is secured to the inner side of the said central portion, e.g. by spot welding.

In the preferred embodiment according to 1-3 the cylindrical saw blade 14 may be provided with a number of holes, if desired. Moreover, for a high quality saw it will be preferable to effect a tooth hardening upon the cylindrical blade being rolled up.

Figure 6:
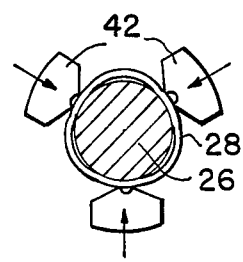
FIG. 6 shows a sleeve according to the invention being deformed by the jaws of a chuck.

In the embodiment of FIG. 5 the sleeve 28 is a closed tube, i.e. without any through-going split or without any split at all. When such a sleeve is suitably thin-welled and flexible it may, as shown in FIG. 6, be deformed by the action of the jaws 42 of a chuck so as to be firmly clamped between the jaws 42, and the central drill bit 26. When the jaws 42 are released the drill bit, if so desired, will be easy to retract from the sleeve, and the sleeve may—or may not—resume its original shape. It will still be remountable on the same or a similar drill bit, and, in renewed use, the chuck jaws 42 may act on the sleeve at the same places as before or even between these places, whereby the sleeve will be re-deformed. The original cross sectional shape of the sleeve may be circular cylindric, or it may be preshaped generally according to FIG. 6.

When the sleeve is provided with one or more splits 20 the width of these splits should preferably be small enough to prevent the jaws of ordinary chucks from engaging direct with the surface of the drill bit, i.e. the maximum width should be some 1-4 mm or, preferably, less than 20°. In other words, the width of the splits should not, preferably, essentially exceed the thickness of the sleeve wall material, which is typically some 0.8-2 mm.

What is claimed is:

1. A hole drilling implement of the cylindrical saw blade type mountable on a drill bit for use with a drilling machine having a chuck with a clamping means, the implement comprising a cylindrical saw blade having at one end a circular row of saw teeth and connected at an opposite end thereof with a carrier element having a central hole for receiving a drill bit held in the clamping means of the drilling machine chuck, said carrier element being provided with an axially split, relatively narrow sleeve portion projecting from the carrier element concentrically with the cylindrical saw blade to the other side of the carrier element, the sleeve portion having a general shape of an elongate and substantially smooth cylinder of a small wall thickness operable to be radially clamped between the shank portion of the drill bit held in the clamping means and the clamping means of the drilling machine chuck whereby both an axial and non-rotational anchoring between the chuck, drill bit, and sleeve portion is solely provided by the radial clamping.

2. An implement according to claim 1, in which the sleeve portion is provided integrally with the carrier element as a metal sheet member.

3. An implement according to claim 2, in which even the saw blade cylinder is provided integrally with the carrier element and the sleeve element, the entire implement thus being made of one metal sheet member.

4. An implement according to claim 2, in which the carrier element is divided in segments between radial splits, the individual segments along their outer edges being rigidly associated with the saw blade cylinder, while along their central edges they are extended into respective part-cylindrical members together forming said sleeve portion.

5. An implement according to claim 3, characterized in that it is made of a rolled up metal sheet member so having an axial split through both the saw blade cylinder, the carrier element portion and the sleeve portion, the carrier element includes generally triangular segments folded inwardly by die pressing so as to form radial splits between them.

6. An implement according to claim 1, in which the sleeve portion is an axially split tube element, one end of which is deformed so as to have outstanding collar or wing means, which are secured to a central surface area of a separate carrier element.

7. A hole drilling implement of the cylindrical saw blade type mountable on a drill bit for use with a drilling machine having a chuck with clamping means, the hole drilling implement comprising a cylindrical saw blade having at one end a circular row of saw teeth and at an opposite end thereof connected with a carrier element having a central hole for receiving a drill bit held in the clamping means of the drilling machine chuck, said carrier element being provided with a relatively narrow sleeve portion projecting from the carrier element concentrically with the cylindrical saw blade to the other side of the carrier element, the sleeve portion having a general shape of an elongate and substantially smooth cylinder of a small wall thickness operable to be radially clamped between the shank portion of the drill bit held in the clamping means and the clamping means of the drilling machine chuck whereby both an axial and non-rotational anchoring between the chuck, drill bit and the sleeve portion is solely provided by the radial clamping.

8. An implement according to claim 7, in which the sleeve cylinder is provided with at least one narrow axial splits of a width not essentially exceeding the thickness of the sleeve material.

9. A hole drilling implement according to claim 8, wherein the axial splits have a width of less than 20°.

10. A hole drilling implement according to claim 8, wherein the thickness of the wall is in a range of between 0.8-2 mm.

* * * * *